(12) United States Patent
Baaijens et al.

(10) Patent No.: US 10,039,170 B2
(45) Date of Patent: Jul. 31, 2018

(54) LIGHTING SYSTEM FOR ILLUMINATING AN ARTICLE

(71) Applicant: PHILIPS LIGHTING HOLDING B.V., Eindhoven (NL)

(72) Inventors: Johannes Petrus Wilhelmus Baaijens, Eindhoven (NL); Simone Helena Maria Poort, Eindhoven (NL); Daniel Willem Elisabeth Schobben, Eindhoven (NL); Anna Louise Bouwkamp-Wijnoltz, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/127,326

(22) PCT Filed: Mar. 17, 2015

(86) PCT No.: PCT/EP2015/055491
§ 371 (c)(1),
(2) Date: Sep. 19, 2016

(87) PCT Pub. No.: WO2015/140131
PCT Pub. Date: Sep. 24, 2015

(65) Prior Publication Data
US 2017/0150571 A1 May 25, 2017

(30) Foreign Application Priority Data
Mar. 17, 2014 (EP) ..................... 14160191

(51) Int. Cl.
*H05B 33/00* (2006.01)
*H05B 33/08* (2006.01)
*A23B 4/00* (2006.01)

(52) U.S. Cl.
CPC .......... *H05B 33/0872* (2013.01); *A23B 4/00* (2013.01); *H05B 33/0854* (2013.01); *A23V 2002/00* (2013.01)

(58) Field of Classification Search
CPC ... H05B 37/0227; H05B 39/044; F21V 11/08; F21V 3/0427; F21V 3/0445;
(Continued)

(56) References Cited

U.S. PATENT DOCUMENTS

| 6,275,163 B1 | 8/2001 | Bogorad et al. |
| 2008/0136356 A1 | 6/2008 | Zampini et al. |

(Continued)

FOREIGN PATENT DOCUMENTS

| EP | 813353 B1 | 9/2001 |
| FR | 2624712 A1 | 6/1989 |

(Continued)

*Primary Examiner* — Monica C King
(74) *Attorney, Agent, or Firm* — Akarsh P. Belagodu (57) ABSTRACT

According to an aspect of the present inventive concept, this and other objects are achieved by a lighting system (100) for illuminating an article (112) comprising: a lighting device (102) arranged to emit light (103) towards the article (112), wherein a spectrum of the emitted light (103) is controllable. The lighting system (100) further comprises a controller (104) configured to control the lighting device (102) responsive to detection of presence or movement of an object (110) within a detection zone (108) associated with the article (112). The controller (104) is configured to: control the lighting device (102) to emit light (103) having a first spectrum in response to absence of an object (110) or movement of an object (110) within the detection zone (108), and control the lighting device (102) to emit light having a second spectrum in response to presence of an object (110) or movement of an object (110) within the detection zone (108). The light having the first spectrum presents, in at least one wavelength interval, a lower power (Continued)

than the light having the second spectrum. Moreover the light having the first spectrum and the light having the second spectrum provide a corresponding level of illumination of the article (112).

14 Claims, 3 Drawing Sheets (58) Field of Classification Search
CPC .... F21V 3/0463; F21V 3/0472; F21V 7/0008; F21V 7/0041; F21V 7/06; F21V 9/02
See application file for complete search history.

(56) References Cited

U.S. PATENT DOCUMENTS

| | | |
|---|---|---|
| 2009/0310348 A1 | 12/2009 | Laski et al. |
| 2010/0301767 A1 | 12/2010 | Van De Sluis et al. |
| 2011/0298379 A1 | 12/2011 | Jung et al. |
| 2013/0120678 A1* | 5/2013 | Chao .................. G02F 1/01 349/34 |
| 2015/0289347 A1* | 10/2015 | Baaijens ............ H05B 37/0227 315/294 |

FOREIGN PATENT DOCUMENTS

| | | |
|---|---|---|
| GB | 2459180 A | 10/2009 |
| WO | WO2010058370 A2 | 5/2010 |
| WO | WO2010131170 A1 | 11/2010 |
| WO | WO2011070473 A1 | 6/2011 |
| WO | WO2013011409 A1 | 1/2013 |

* cited by examiner

LIGHTING SYSTEM FOR ILLUMINATING AN ARTICLE

CROSS-REFERENCE TO PRIOR APPLICATIONS

This application is the U.S. National Phase application under 35 U.S.C. § 371 of International Application No. PCT/EP2015/055491, filed on Mar. 17, 2015, which claims the benefit of European Patent Application No. 14160191.4, filed on Mar. 17, 2014. These applications are hereby incorporated by reference herein.

FIELD OF THE INVENTION

The present inventive concept relates to a lighting system for illuminating an article and use of a lighting system for illuminating an article.

BACKGROUND OF THE INVENTION

In such various environments as shops, malls, grocery stores, museums, art galleries, exhibition spaces, restaurants etc, it is generally desirable to provide lighting which presents displayed articles in an as attractive and pleasing manner as possible to the viewer or customer. To be spared from manually operating the lighting it is known to provide automatic control of lighting for switching lighting in the environment on or off based on presence of people and movement in the environment. One example is automatically turning on room lighting or article lighting in a space when a person enters. However such basic control of the lighting may not always provide a sufficient degree of control of the lighting or yield a desired experience for a visitor, who for example may be a customer in a store or a visitor at a museum. Furthermore, switching lighting on and off in a space may appear disturbing to people in adjacent spaces. A dark space in for example a store or museum may also appear uninviting and thus not attract people. There is hence room for improvement in the field of lighting control.

SUMMARY OF THE INVENTION

The inventors have realized that, although the presentation of an article may be improved by appropriate lighting thereof, some articles may be sensitive to light in the sense that they may deteriorate or be discolored more quickly when illuminated. A discolored article, whether a painting or a food article, is clearly counter to the general desire to display articles in an as attractive and pleasing manner as possible. The inventors have further realized that reducing discoloration by simply turning the lighting off when no people are near the article is not an optimum solution in many situations. As mentioned above, switching lighting on and off in a space may appear disturbing to people in adjacent spaces and may also create dark spaces in for example a store or museum which thereby may appear uninviting. Based on this insight, a general object of the present inventive concept is to provide an adaptive lighting system providing an improved experience for a viewer while limiting negative impact on the displayed and illuminated article.

According to a first aspect of the present inventive concept, this and other objects are achieved by a lighting system for illuminating an article comprising: a lighting device arranged to emit light towards the article, wherein a spectrum of the emitted light is controllable. The lighting system further comprises a controller configured to control the lighting device responsive to detection of presence of an object or movement of an object within a detection zone associated with the article. The controller is configured to: control the lighting device to emit light having a first spectrum in response to absence of an object or movement of an object within the detection zone, and control the lighting device to emit light having a second spectrum in response to presence of an object or movement of an object within the detection zone. The light having the first spectrum presents, in at least one wavelength interval, a lower power than the light having the second spectrum. Moreover the light having the first spectrum and the light having the second spectrum provide a corresponding level of illumination of the article.

An article may thereby be illuminated with light having different spectrums with different spectral power distributions depending on whether an object, e.g. a potential viewer of the article, is near the article or not. Since the light is not merely switched on or off depending on the presence or movement of the object but instead is changed from a first spectrum to a second spectrum, which spectrums provide a corresponding level of illumination of the article, the switching may cause a minimum of distraction for persons in or near the detection zone. In fact the switch may not even be noticeable. Additionally, dark spaces may be avoided wherein viewers may be attracted to the article. Moreover, by the first spectrum presenting, in at least one wavelength interval, a lower power than the second spectrum, enables the article to be illuminated with light improving the appearance of the article when a viewer is within the detection zone (and thus is more likely to closely inspect the article) and with light tending to discolor the article to a lesser degree when a viewer is outside the detection zone (and thus is out of close viewing distance of the article). When viewing the article from a distance use of wavelengths improving the appearance of the article may be less important for the overall impression of the article wherefore a less attractive illumination may be acceptable.

The object may be a person present in the detection zone, entering the detection zone, or moving within the detection zone. The type of person may depend on the environment in which the lighting system is used. Non-limiting examples of the person are a customer in a store, such as a grocery store, or a visitor in a museum, an art gallery or the like.

The detection zone may be arranged to include a space in which the article is arranged. The detection zone may additionally or alternatively be arranged to encompass a space adjacent to the article, nearby the article, or any space from which the article is intended to be viewed.

The light having the first spectrum may present, in at least one wavelength interval, a lower power than the second spectrum and, in at least a second wavelength interval, a higher power than the second spectrum such that the light having the first spectrum and the light having the second spectrum provide a corresponding level of illumination of the article.

The light having the first spectrum and the light having the second spectrum may provide a corresponding or equal illuminance. The light having the first spectrum and the light having the second spectrum may provide a corresponding or equal irradiance.

The article to be illuminated may be a light sensitive article, i.e. a photosensitive article. The article may be sensitive to light in the visible spectrum. The article may for example be a photograph, a document, a painting, an artwork, fabrics, an artifact or other photosensitive article.

According to another example the article may be a foodstuff such as a produce, a fruit, a vegetable or a meat article. The inventive lighting system is advantageously used for illuminating such articles for providing an attractive presentation thereof while limiting discoloration.

According to one embodiment, the first spectrum is a predetermined first spectrum and the second spectrum is a predetermined second spectrum, wherein the predetermined first and second spectrums are predetermined such that illumination of the article with the light having the predetermined first spectrum results in less discoloration of the article than if the article had been illuminated with the light having the second predetermined spectrum, for an equal duration. For a given article (such as any of the light sensitive articles exemplified above) light of certain wavelengths may more strongly contribute to the perceived quality of the light and thus in turn contribute to an attractive illumination of the article. Such light may be referred to as "higher quality light". Meanwhile, light of these wavelengths may when incident on the surface of the article cause physical or chemical reactions in the material making up the article and thereby lead to discoloration of the article. The present embodiment makes it possible to limit the use of the "higher quality light" to situations when a potential viewer is within the detection zone, wherein a high quality presentation may be appreciated. When no potential viewer is within the detection zone a less discoloring light (e.g. a "lower quality light") may be used.

According to one embodiment of the lighting system the first spectrum is a predetermined first spectrum and the second spectrum is a predetermined second spectrum, wherein the predetermined first and second spectrums are predetermined such that the light having the predetermined first spectrum presents, in at least a wavelength interval in which the article absorbs light, a lower power than the second spectrum. The article may present an absorption profile including one or more peaks or regions presenting an increased absorption. Light of wavelengths close to or at the absorption peaks or regions for an article may contribute to the perceived quality of the light and thus in turn contribute to an attractive illumination of the article. Meanwhile, light of such wavelengths may, per definition, to a greater extent than light of other wavelengths be absorbed by the article and may, for example through physical or chemical reactions, cause a change in the material making up the article and thereby lead to discoloration of the article. The present embodiment makes it possible to limit the use of the "higher quality light" to situations when a potential viewer is within the detection zone, wherein a high quality presentation is advantageous. When no potential viewer is within the detection zone a less discoloring "lower quality light" may be used. The present embodiment may be particularly advantageous for illuminating a photograph, a painting or similar artwork. An artwork may include color pigments which are more favorably rendered in light including wavelengths close to or at the color of the pigment. However light of such wavelengths may also be absorbed by the color pigments and thereby over time damage the pigments.

According to one embodiment the light having the first spectrum and the light having the second spectrum present a corresponding correlated color temperature. Thereby a change between light of the first spectrum and light having the second spectrum may appear less conspicuous to a person entering or leaving the detection zone. The correlated color temperature of the light having the first spectrum and the light having the second spectrum may be equal, or at least substantially equal. A difference between a correlated color temperature of the first spectrum and a correlated color temperature of the second spectrum may be equal to or less than 50 K.

According to one embodiment the light having the first spectrum and the light having the second spectrum present a corresponding distance to the black body locus. In this context the black body locus may refer to the black body line or the Planckian locus. Thereby a change between light of the first spectrum and light of the second spectrum may appear less conspicuous to a person entering or leaving the detection zone. The present embodiment may advantageously be combined with the previous embodiment wherein the light having the first spectrum and the light having the second spectrum may present a corresponding correlated color temperature and a corresponding distance to the black body locus. This may provide for an even more seamless transition between the first and the second spectrums. In a particular embodiment the distance to the black body locus for the light having the first spectrum and the light having the second spectrum may be equal, or at least substantially equal. In particular a color point of the light having the first spectrum and a color point of the light having the second spectrum may be on the black body locus.

According to one embodiment, the light having the first spectrum presents a lower color rendering index than the light having the second spectrum. Light of a higher color rendering index may per definition provide a higher quality (in the sense of more accurate) rendition of the colors of the article than light of a lower color rendering index. Light having a higher color rendering index may however have a richer spectral content than light of a lower color rendering and may therefore, in line with the previous discussion, accelerate discoloring of the article. By changing between higher color rendering index light and lower color rendering index light in accordance with the present embodiment, the benefits of higher color rendering index light may be enjoyed while reducing its negative effects.

According to one embodiment the lighting device comprises a plurality of light sources, each light source being arranged to emit light of a different color than the other light sources, and the intensity of each light source being independently controllable by the controller, wherein the lighting device is arranged to emit mixed light. The plurality of light sources may for example be a plurality of light emitting diodes (LEDs). LEDs lend themselves for compact and power efficient lighting with accurately controllable light output intensity. By appropriate control of the absolute and/or relative intensities of the light sources light with an adaptable spectrum, and especially the first and second spectrums, may be obtained.

According to one embodiment the lighting device comprises at least four light sources. Use of four light sources, each emitting light of a different color, makes it possible to conveniently control the spectrum of the mixed light by changing the spectral content in accordance with the present inventive concept, while meeting the boundary condition of maintaining a corresponding or equal level of illumination as well as one or more of the further boundary conditions mentioned above, such as maintaining the color temperature or a distance to the black body locus when switching from the first spectrum to the second spectrum (or vice versa), or changing the color rendering index from a lower index to a higher index when switching from the first spectrum to the second spectrum (and vice versa).

According to one embodiment the lighting device comprises a red, a green, a blue and an amber light source, RGBA, such as a red LED, a green LED, a blue LED and an amber LED. This combination of light sources may be conveniently controlled to provide mixed light which may be perceived as white light by a viewer, both for the first and the second spectrum. By the addition of the amber light source it further becomes possible to compensate for the reduced power in the at least one wavelength interval of the first spectrum by increasing the power in a second wavelength interval such that a corresponding level of illumination may be maintained when switching between the first and the second spectrum.

According to one embodiment the lighting system further comprises a detector for defining a detection zone associated with the article and being arranged to detect presence or movement of an object within the detection zone. The detector may be arranged to determine a distance to a detected object, wherein the controller may be arranged to control the lighting device based on the determined distance to provide a gradual transition between the light having the first spectrum and the light having the second spectrum. The change between the first and second spectrums may thereby be virtually unnoticeable. The determined distance may relate to a distance between the detector and the object, a distance between the article and the object, or a distance between a predetermined position (which may be at or near the article) and the object, depending on for example the environment in which the lighting system is used.

During the development of the present inventive concept the inventors have realized that one type of article which is particularly sensitive to light is meat, for example raw meat, processed meat and sliced meat. It is not uncommon that a meat article, which is displayed for example in a meat counter, after some time becomes discolored in a way that makes the meat article generally unattractive for a potential customer. As a result the meat article may be disposed of, which is economically and environmentally wasteful. The inventors have realized that the spectrum of the lighting strongly influences the rate of discoloration of a meat article. By using the inventive lighting system of the first aspect, or any of the above-mentioned embodiments thereof, for illuminating a meat article it becomes possible to optimize the presentation of the meat article while limiting the discoloration. Accordingly, in accordance with a second aspect of the present inventive concept there is provided the use of a lighting system for illuminating a meat article, the lighting system comprising: a lighting device arranged to emit light towards the article, wherein a spectrum of the emitted mixed light is controllable, and a controller configured to control the lighting device responsive to detection of presence or movement of an object within a detection zone associated with the article. The controller is further configured to: control the lighting device to emit light having a first spectrum in response to absence of an object or movement of an object within the detection zone, and control the lighting device to emit light having a second spectrum in response to presence of an object or movement of an object within the detection zone. The first spectrum is arranged to present, in at least one wavelength interval, a lower power than the second spectrum. Moreover the light having the first spectrum and the light having the second spectrum are arranged to provide a corresponding level of illumination of the meat article.

In line with the above discussion, by the first spectrum presenting, in at least one wavelength interval, a lower power than the second spectrum, illumination of the meat article with wavelengths providing a desired rendition of the meat article when a viewer is within the detection zone is enabled (e.g. close to a meat counter in a grocery store or a delicatessen) and thus is more likely to closely inspect the meat article. Meanwhile when a viewer is out of close viewing distance of the meat article use of wavelengths improving the appearance of the article may be less important for the overall impression of the article wherefore wavelengths improving the appearance of the article but tending to discolor the article may be avoided or at least reduced more or less unnoticeably. In particular the discoloration may be limited without resorting to switching the light off or reducing the intensity thereof. Consequently the meat may be illuminated to attract customers viewing the meat from a distance as well as from a close distance while limiting discoloration of the meat article.

The advantages, details and embodiments disclosed in connection with the first aspect above are applicable also to the second aspect wherefore reference is made to the above discussion. Additional embodiments, applicable both to the first and the second aspect will be described in the following:

According to one embodiment of the first or second aspect, the light having the first spectrum presents a lower power than the light having the second spectrum within a wavelength interval from 550 nm to 600 nm. Following systematic study of the discoloration of meat articles it has been concluded that wavelengths in the afore-mentioned interval from 550 nm to 600 nm may discolor meat more quickly than other wavelengths. The present embodiment hence makes it possible to avoid strongly discoloring wavelengths when no potential viewers or customers are nearby for close inspection of the meat article. In a particular embodiment the first spectrum has zero, or substantially zero, power within said wavelength interval from 550 nm to 600 nm. The light having the second spectrum may present a non-zero power within said wavelength interval.

According to one embodiment of the first or second aspect the lighting device comprises a red, a green, a blue and an amber light source (e.g. in the form of a red LED, a green LED, a blue LED and an amber LED), wherein an output power of the amber light source is lower for the light having the first spectrum compared to an output power of the amber light source for the light having the second spectrum. This provides a simple way of limiting discoloration of meat by reducing an intensity of the amber light source.

According to a third aspect of the present inventive concept, there is provided the use of a lighting system for illuminating a light sensitive article, the lighting system comprising: a lighting device arranged to emit light towards the article, wherein a spectrum of the emitted light is controllable, and a controller configured to control the lighting device responsive to detection of presence or movement of an object within a detection zone associated with the article. The controller is configured to: control the lighting device to emit light having a first spectrum in response to absence of an object or movement of an object within the detection zone, and control the lighting device to emit light having a second spectrum in response to presence of an object or movement of an object within the detection zone. The first spectrum is arranged to present, in at least one wavelength interval, a lower power than the second spectrum, and the light having the first spectrum and the light having the second spectrum are arranged to provide a corresponding level of illumination of the article.

As mentioned above the light sensitive article may be any one of a photograph, a document, a painting, an artwork, fabrics, an artifact or other photosensitive article. Any of the advantages, details and embodiments disclosed in connection with the first and the second aspect above are applicable also to the third aspect and present the same or corresponding advantages. They will therefore not be repeated but reference is instead made to the above discussion.

Further features and advantages of the present inventive concept will become apparent when studying the appended claims and the following description. The skilled person realize that different features of the present inventive concept may be combined to create embodiments other than those described in the following, without departing from the scope of the present inventive concept.

BRIEF DESCRIPTION OF THE DRAWINGS

These and other aspects of the present inventive concept will now be described in more detail, with reference to the appended drawings showing embodiment(s) of the invention, wherein like reference numerals refer to like elements throughout.

DETAILED DESCRIPTION

The present invention will now be described more fully hereinafter with reference to the accompanying drawings, in which currently preferred embodiments of the present inventive concept are shown. This invention may, however, be embodied in many different forms and should not be construed as limited to the embodiments set forth herein; rather, these embodiments are provided for thoroughness and completeness, and fully convey the scope of the inventive concept to the skilled person.

Figure 1:
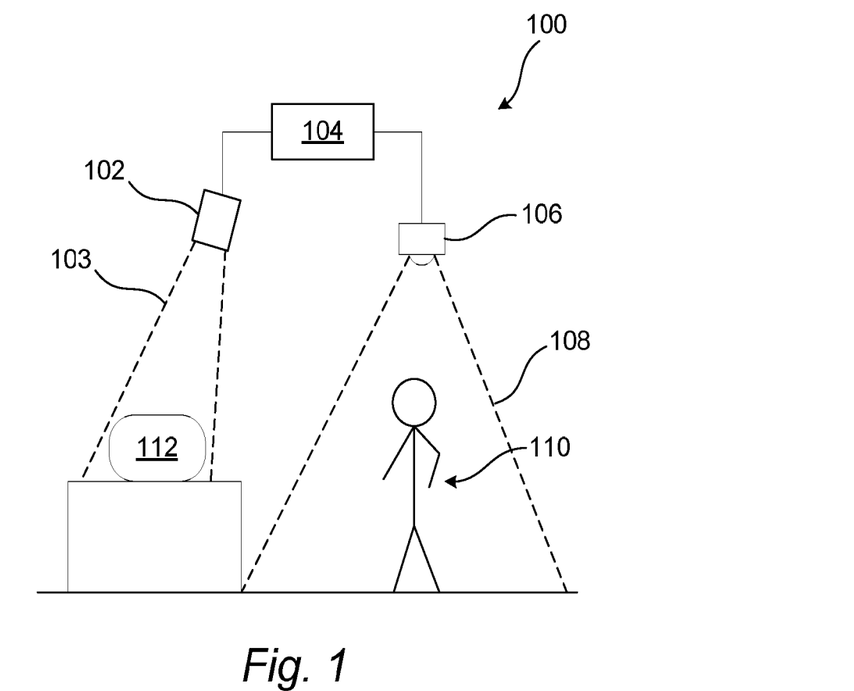
FIG. 1 schematically illustrates a lighting system according to an embodiment.

FIG. 1 schematically illustrates a lighting system 100 in accordance with an aspect of the present inventive concept. The system 100 comprises a lighting device 102. The lighting device 102 is arranged to emit mixed light comprising a plurality of colors towards an article, as schematically illustrated by light beam 103 emitted towards the article 112 in FIG. 1. The article 112 may be a photograph, a document, a painting, an artwork, fabrics or an artifact. According to another example the article may be a foodstuff such as a produce, a fruit, a vegetable or a meat article. The inventive lighting system is especially advantageous to use for illuminating light sensitive articles, i.e. photosensitive articles, in that it enables an attractive presentation of the article while limiting discoloration of the same. Although in the following reference will be made to "an article", it is to be understood that a plurality of such articles may be provided within the space illuminated by the lighting device 102.

As will be described in detail in the following a spectrum of the emitted light 103 is controllable. The lighting device 102 may comprise a plurality of light sources. The lighting device 102 may comprise a plurality of solid-state light sources, such as light emitting diodes (LEDs). The LEDs may be organic LEDs or inorganic LEDs. Each light source of the lighting device 102 may be arranged to emit light of a different color than the other light sources of the lighting device 102. Thus each light source may emit light of a different spectrum, i.e. within a different wavelength interval (which may or may not be partially overlapping), wherein the lighting device 102 is arranged to emit mixed light. According to some embodiments, the lighting device 102 may comprise a red LED, a green LED and a blue LED (an RGB light emitter). According to some embodiments the lighting device 102 may comprise a red LED, a green LED, a blue LED and an amber LED (an RGBA light emitter). The lighting device 102 may further be arranged to allow independent control of the intensity of each light source.

The system 100 further comprises a controller 104. The controller 104 is configured to control the light output of the lighting device 102. More specifically the controller 104 is configured to control the lighting device 102 responsive to detection of presence or movement of an object within a detection zone associated with the article 112, as will be described in detail below. The operation of the controller 104 may be implemented using a microprocessor, a microcontroller, a programmable digital signal processor or another programmable device. The controller 104 may also, or instead, include an application specific integrated circuit, a programmable gate array or programmable array logic, a programmable device such as the microprocessor, microcontroller or programmable digital signal processor mentioned above; the processor may further include computer executable code that controls operation of the programmable device. The controller 104 may provide control signals to the lighting device 102 via a wired or wireless connection. The controller 104 may control the spectrum of the emitted light by providing appropriate control signals to the lighting device 102. For a lighting device 102 comprising a plurality of light sources the controller 104 may provide a multi-component control signal to the lighting device 102, each component indicating an intensity level for a respective light source. For an RGB light emitter the control signal may indicate an intensity level for each channel, i.e. a red LED, a blue LED, a green LED. For an RGA light emitter the control signal may indicate an intensity level for each channel, i.e. a red LED, a blue LED, a green LED, an amber LED.

The system 100 further comprises a detector 106 defining a detection zone 108. The detector 106 is arranged to detect presence of or movement of an object, such as the person 110, within the detection zone 108. The detector 106 may sense infrared radiation within the detection zone 108 and detect the object 110 or movement thereof by sensing a changed infrared radiation within the detection zone 108. The detector 106 may include a camera capturing images of the detection zone 108 and detect the object 110 or movement thereof within the detection zone 108 by comparing consecutive captured images. The detector 106 may include a switch or pressure sensor, arranged at or in the ground such that a person entering the detection zone 108 actuates the switch or pressure sensor, wherein the detector 106 may determine that the person is present or moving within the detection zone 108. Further non-limiting examples of detectors are detecting radiofrequency signals, such as Bluetooth signals, from a mobile device carried by the person 110 or signals from a handheld scanner which are commonly used in supermarkets. The detection may also be sound-based, wherein presence of the person 110 may be detected by detecting a sound (voice, impact sound etc.) from within the detection zone 108 or exceeding a predetermined threshold. The detector 106 may provide detection signals to the controller 104 via a wired or wireless connection. The detector 106 may for example be arranged to output a first signal to the controller 104 in response to detecting the object 110 or movement of the object 110 within the detection zone 108. The detector 106 may further be arranged to output a second signal, which is different from the first signal, to the controller 104 in absence of any object or movement thereof within the detection zone 108. The controller 104 is configured to control the lighting device 102 to emit light 103 having a first spectrum towards the article 112 in response to absence of an object or movement of an object within the detection zone 108. The controller 104 is further configured to control the lighting device 102 to emit light 103 having a second spectrum towards the article 112 in response to presence of the object 110 or movement of the object 110 within the detection zone 108.

According to the present inventive concept, the light having the first spectrum presents, in at least one wavelength interval, a lower power than the second spectrum in the at least one wavelength interval. In other words the light having the first spectrum presents a first spectral power distribution and the light having the second spectrum presents a second spectral power distribution which is different from the first spectral power distribution. The light having the first spectrum may further present in at least a second wavelength interval, a higher power than the second spectrum such that the light having the first spectrum and the light having the second spectrum provide a corresponding level of illumination of the article 112. According to some embodiments the light having the first spectrum and the light having the second spectrum may provide a corresponding illuminance level (e.g. as measured in lux). According to some embodiments the light having the first spectrum and the light having the second spectrum may provide a corresponding irradiance level (e.g. as measured in $W/m^2$). Advantageously the illumination level, the illuminance or the irradiance of the light having the first spectrum and the light having the second spectrum may be the same or equal. However according to some embodiments it may suffice that the illumination level, the illuminance or the irradiance of the light having the first spectrum and the light having the second spectrum sufficiently correspond to each other in the sense that switching between the first and second spectrums does not produce a change of the light level which is disturbing or noticeable to a person entering the detection zone 108. The first and the second spectrums of the light may further be adapted in accordance with different environments, different applications or for different types of articles.

According to one embodiment, the first spectrum is a predetermined first spectrum and the second spectrum is a predetermined second spectrum, wherein the predetermined first and second spectrums are predetermined such that illumination of the article 112 with the light having the predetermined first spectrum results in less discoloration of the article 112 than if the article 112 had been illuminated with the light having the second predetermined spectrum, for a same, i.e. equal, duration. Thus wavelengths which are known to accelerate discoloration of the article 112 may be omitted in the first spectrum when no viewer 110 is present in the detection zone 108. Conversely, these wavelengths may be present in the second spectrum when a viewer 110 is present in the detection zone 108. It may be desirable to include wavelengths for which the article 112 is photosensitive in case they contribute to an attractive presentation of the article 112. The wavelength intervals which cause an accelerated discoloration may for example be established by subjecting a number of different articles of a same type to light of different wavelengths and identical power and compare the apparent discoloration of the different articles. The wavelengths causing the strongest discoloration may be omitted or at least limited in the first spectrum.

For some types of articles, shorter wavelengths, such as for example wavelengths below 430 nm, may be more likely to cause reactions that may damage the light sensitive artifacts and cause discoloration. Therefore, the first spectrum may be arranged or predetermined to present a lower power compared to the second spectrum in an interval of shorter wavelengths (to reduce the risk of discoloration) and a higher power compared to the second spectrum in an interval of longer wavelengths (to maintain a corresponding level of illumination). As is known by the skilled person, the human eye becomes less sensitive as the wavelength approaches 400 nm. Thus, configuring the first spectrum to present a reduced or zero power below for example 410, 420 or 430 nm may reduce discoloration of some light sensitive artifacts.

The first spectrum may be arranged or predetermined to present a lower power, compared to the second spectrum, in one or more wavelength intervals in which the article 112 absorbs light ("absorbing wavelength intervals"). To maintain a corresponding illumination level for the first and the second spectrums the first spectrum may be arranged to present a higher power, compared to the second spectrum, in one or more other wavelength intervals, other than the "absorbing wavelength intervals". These one or more other wavelength intervals are advantageously wavelength intervals in which the article 112 presents a lower absorption, compared to the "absorbing wavelength intervals". If illuminating for example a painting including a pigment strongly absorbing light of a particular color, that particular color, and nearby colors, may be avoided in the first spectrum to reduce the risk of accelerating discoloration but included in the second spectrum to provide a high quality rendition of the painting.

In some applications it may be advantageous to impose further requirements, i.e. boundary conditions, on the first and the second spectrums. In particular it may be advantageous to arrange the first and second spectrums such that changes between the spectrums are as unnoticeable as possible to people (i.e. objects 110) entering/leaving the detection zone 108 and to people looking in the general direction of the article 112 from outside the detection zone 108. The following additional requirements on the spectrums may advantageously be combined with the above mentioned embodiments aiming at limiting discoloration of the article 112.

According to one boundary condition the light having the first spectrum and the light having the second spectrum may present a corresponding or substantially equal correlated color temperature. Thereby a change between light of the first spectrum and light having the second spectrum may be less conspicuous. The first and the second spectrums may for example be arranged such that a color temperature of the light having the first spectrum and a color temperature of the light having the second spectrum fall on a same line of constant correlated color temperature in a given chromaticity space.

According to an additional or alternative boundary condition the light having the first spectrum and the light having the second spectrum may present a corresponding distance to the black body locus (i.e. the black body line or Planckian locus). In particular, a distance (which may be zero) to the black body locus of the light having the first spectrum and the light having the second spectrum may be equal, or at least substantially equal. In particular a color point of the light having the first spectrum and a color point of the light having the second spectrum may be on the black body locus. A distance between a color point of the light to the black body locus may be calculated using an appropriate norm (for example the Euclidean norm) in a given chromaticity space.

According to an additional or alternative boundary condition, the light having the first spectrum presents a lower color rendering index (CRI) than the light having the second spectrum. Thereby lower CRI light may be used when no viewer is within the detection zone 108 wherein the lower spectral content light may limit discoloration of the article 112. Conversely higher CRI light may be used when a viewer 110 is within the detection zone 108 wherein a greater spectral content may improve the presentation of the article 112.

In the above, reference has been made to chromaticity spaces. As is well-known to the person skilled in the art there exist a number of chromaticity spaces and the above boundary conditions are not limited to a particular chromaticity space but present a general applicability.

Figure 3:
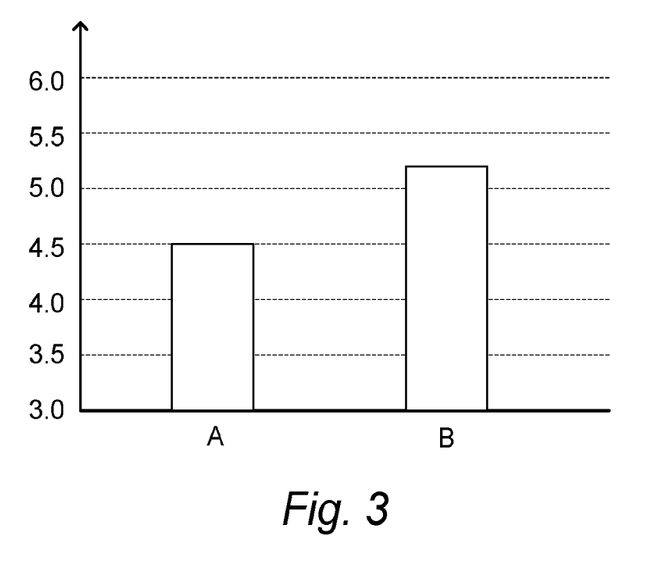
FIG. 3 illustrates test results comparing discoloration of a specific type of meat for a conventional lighting system and a lighting system in accordance with an embodiment of the present inventive concept.

As discussed above the lighting system in accordance with the present inventive concept is suitable for illuminating a meat article. Following systematic study of discoloration of meat in different lighting the inventors have realized that meat may be particularly sensitive to wavelengths in the interval 550 nm to 600 nm. FIG. 3 illustrates the result of a test aiming at comparing the discoloration of a sliced liver sausage when illuminated by a conventional white high pressure sodium lamp at 500 lx (bar A), and when illuminated by light at 500 lx and having a spectrum with a reduced power, compared to the sodium lamp, in the wavelength interval 550 nm to 600 nm (bar B). The persons of the test group were shown several samples of sliced meat which had been illuminated with the different light sources for different durations. The persons were asked to indicate which level of discoloration they found to be unacceptable. The level of discoloration at which 50% of the test persons considered the discoloration to be unacceptable was taken as a reference point. The graph indicates the time taken to reach the unacceptable level of discoloration with the respective spectrum. As indicated in FIG. 3 the lighting having a reduced power in the afore-mentioned wavelength interval 550 nm to 600 nm presented approximately a 16% improvement in time over the conventional lighting. Greater improvements may be achieved with even lower power in the wavelength interval 550 nm to 600 nm.

Accordingly there is provided an embodiment wherein the lighting system 100 is used for illuminating a meat article. The meat may be raw, sliced, unsliced meat or minced. The meat may be red meat. According to the present embodiment the controller 104 is configured to control the lighting device 102 to emit light 103 having the first spectrum in response to absence of an object 110 or movement of an object 110 within the detection zone 108. The controller 104 is further configured to control the lighting device 102 to emit light 103 having the second spectrum in response to presence of an object 110 or movement of an object 110 within the detection zone 108. Moreover the first spectrum presents a lower power than the second spectrum within a wavelength interval from 550 nm to 600 nm. The light of the first spectrum may present a zero, or negligible, power within this wavelength interval. Alternatively, the light of the first spectrum may at least present a reduced power in this wavelength interval, compared to the light of the second spectrum. The light of the second spectrum may, or may not, include wavelengths falling within the wavelength interval 550 nm to 600 nm. This may depend on whether or not light of wavelength between 550 to 600 nm contributes to the desired presentation of the meat 112. The color temperature of the light of the first spectrum and the second spectrum may be 2200-4000 K. This may result in an attractive presentation of the meat 112 both when viewed from outside and from within the detection zone 108. The above described additional boundary conditions on color temperature, distance to the black body locus or different CRI may advantageously be applied to the meat lighting embodiment. As described above the lighting device 102 may comprise a plurality of differently colored light sources having an independently controllable intensity. The lighting device 102 may for example include an RGBA light source. In response to absence of an object 110 or movement of an object 110 within the detection zone 108 the controller 102 may control the lighting device 102 to alter the relative intensities of the RGBA LEDs and thereby vary the spectrum of the emitted light. For example, the power of the amber LED may be lower for the light having the first spectrum than the light having the second spectrum.

Figure 2:
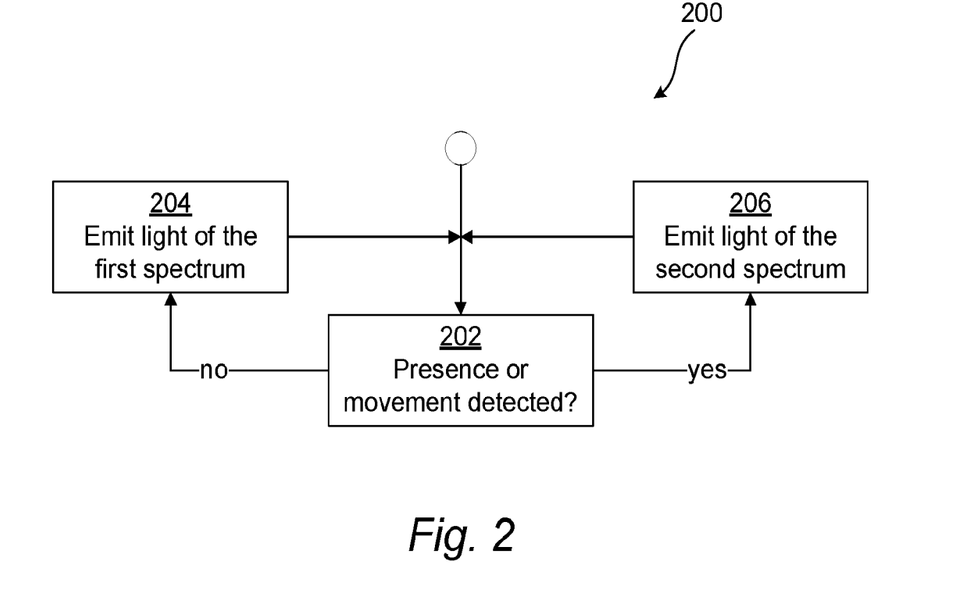
FIG. 2 illustrates a method according to an embodiment.

A method 200 involving the use of the lighting system 100 for illuminating the article 112 will now be described with reference to FIGS. 1 and 2 wherein it will be assumed that the lighting device 102 initially emits light 103 having the first spectrum. The detector 106 monitors the detection zone 108 (step 202) for detection of an object 110 or movement thereof. If no object or movement is detected within the detection zone 108 the controller 104 controls the lighting device 102 to (continue) emitting light 103 having the first spectrum (step 204). If an object 110 or movement thereof is detected within the detection zone 108 the controller 104 controls the lighting device 102 to change the light output to light 103 having the second spectrum (step 206). The controller 104 may be arranged to continue controlling the lighting device 102 to emit light 103 having the second spectrum until the detector 106 determines that the object 110 no longer is present within the detection zone 108, wherein the controller 104 may control the lighting device 102 to return to emitting light 103 having the first spectrum (step 204).

Optionally, the detector 106 may be arranged to determine a distance to the object 110 within the detection zone 108. The detector 106 may for example include a camera capturing images of the detection zone 108 and determine a position of the object 110 within the detection zone 108 using any appropriate image analysis algorithm known in the art. According to another example the detector 106 may include three or more detector sub-units arranged to receive a radiofrequency signal (such as a Bluetooth signal) from a mobile device carried by a person, or from a handheld scanner (which are commonly used in supermarkets). The position of the source of the radiofrequency signal within the detection zone may then be calculated from the signals received at the detector sub-units using e.g. triangulation. In both examples, the determined position may subsequently be translated by the detector 106 to a value indicative of a distance between the detector 106 and the object 110, a distance between the article 112 and the object 110, or a distance between any predetermined position (which may be at or near the article 112) and the object 110. The detector 106 may provide a signal indicating the determined distance to the controller 104. The detector 106 may be arranged to repeatedly determine a distance to the object 110 and repeatedly provide the determined distance to the controller 104. Alternatively the detector 106 may be arranged to determine a distance to the object 110 and provide the determined distance to the controller 104 in response to a changed distance. In case several objects 110, e.g. persons, are present within the detection zone the detector 106 may provide the distance to the object 110 which is closest to the article 112. The controller 104 may, in response to receiving the determined distance from the detector 106, control the lighting device 102 based on the determined distance to provide a gradual transition between the light having the first spectrum and the light having the second spectrum. The gradual transition may be stepwise or continuous. For example, one or more intermediate spectrums may be defined which are intermediate the predetermined first and the predetermined second spectrum and thereby may provide a stepwise transition between the first and the second spectrum. For example, the controller 104 may be arranged to control the lighting device 102 to: emit light of the predetermined first spectrum if the determined distance exceeds a first threshold distance (for example 5 meters, the viewer is distant from the article 112); emit light of a first intermediate spectrum if the determined distance falls between the first and a second threshold distance (for example less than 5 meters but more than 3 meters, the viewer is closer to the article 112); emit light of a second intermediate spectrum if the determined distance falls between the second threshold distance and a third threshold distance (for example less than 3 meters but more than 2 meters, the viewer is even closer to the article 112); and emit light of the predetermined second spectrum if the determined distance falls below the third threshold distance (for example 2 meters, the viewer is able to closely inspect the article 112). For a lighting device 102 comprising a plurality of independently controllable light sources, the controller 104 may provide a control signal to the lighting device 102, indicating an intensity level for each light source. Each intensity level may be a function of the determined distance. The function may for example be a function varying linearly with the determined distance between the maximum and minimum intensities for the light source which, in combination with the minimum and maximum intensities of other light sources, result in the predetermined first and second spectrums. The function may be defined to level out (i.e. present a zero derivative) as the determined distance exceeds a predetermined distance (when the person 112 is far away e.g. 5 meters) and falls below another predetermined distance (when the person is close e.g. 1 meter).

The person skilled in the art realizes that the present invention by no means is limited to the preferred embodiments described above. On the contrary, many modifications and variations are possible within the scope of the appended claims. For example, although being illustrated as entities separate from the lighting device 102, it is contemplated that the controller 104 and the detector 106 may be included in the lighting device 102. Two or more of the lighting device 102, the controller 104 and the detector 106 may for example be arranged in a common unit or enclosure.

Moreover, although in the above reference has been made to different types of light sensitive articles, the lighting system in accordance with the present inventive concept also presents a more general applicability and may be used for illumination of any article or space wherein illumination with light of different spectrums depending on the presence or movement of a person at the article or in the space may be advantageous.

A lighting system in accordance with the present inventive concept may be arranged in a shop, a mall, a grocery store, a museum, an art gallery, an exhibition space or other space in which articles may be displayed. The lighting system may be provided as a supplement to the existing, conventional lighting (providing ambient or background lighting or similar) in the environment in which the lighting system is arranged. It is also contemplated that a plurality of lighting systems in accordance with the present inventive concept may be arranged to replace all lighting in an environment. For example a plurality of lighting systems, similar to the lighting system 100, may provided for lighting articles in adjacent spaces in an environment. Thereby a continuously lit environment may be provided wherein the articles in each space may be illuminated with light improving the appearance of the articles when a viewer is within the space and illuminated with light limiting discoloration of the articles to a when a viewer is outside the detection zone.

According to one aspect, which may be considered as a second and independent inventive concept, there is provided a lighting system for illuminating an article comprising a lighting device arranged to emit light towards the article. The lighting system further comprises a controller configured to control the lighting device and a detector defining a detection zone and being configured to determine position data representing a position of an object within the detection zone. The controller is further configured to determine an illumination level parameter for the lighting device based on said position data. Thereby an illumination level for the article may be varied depending on the position of the object, which may be a potential viewer of the article. In the context of light sensitive articles, it may be understood that the illumination level thereby may be controlled to limit discoloration of the article when no viewer is nearby and optimize the illumination level based on the position of the viewer when the viewer is nearby. By determining the illumination level based on the position it becomes possible to provide a gradually changing illumination level which will minimize distraction for people nearby or within the detection zone.

The illumination level parameter may indicate an illumination level for the lighting device. The controller may further control the lighting device to emit light in accordance with said determined illumination level parameter, wherein the lighting device may emit light at the illumination level indicated by the illumination level parameter. The illumination level parameter may for example indicate an output intensity or output power for the lighting device. The lighting device may include one or more light emitters wherein the controller may determine an illumination level parameter for each of said light emitters.

According to one embodiment the detector is configured to determine a pair of coordinates representing the position of the object within the detection zone. The pair of coordinates may include a first coordinate and a second coordinate. The controller may determine the illumination level parameter as a function of the coordinate pair, i.e. as a function of the first coordinate and the second coordinate. The pair of coordinates may be Cartesian coordinates. However the pair of coordinates may also be polar coordinates. The origin or the pole may for example be positioned at the article, the lighting device or some other arbitrarily chosen fixed position.

According to one embodiment the first coordinate indicates a position of the object along a first direction or first coordinate axis and the second coordinate indicates a position of the object along a second direction or second coordinate axis. The first and the second directions/coordinate axes may be perpendicular.

According to one embodiment the controller is configured to determine the illumination level parameter as a function of the position data. The function may be arranged to provide an illumination level parameter which, for a first range of values of the first coordinate, monotonically increases as a function of the first coordinate and, for a second range of values of the first coordinate, monotonically decreases as a function of the first coordinate. More specifically, the function may further be arranged to, for a fixed value of the second coordinate, provide an illumination level parameter which, for the first range of values of the first coordinate, monotonically increases as a function of the first coordinate and, for the second range of values of the first coordinate, monotonically decreases as a function of the first coordinate. The function may further be arranged to provide an illumination level parameter which, for a third range of values of the second coordinate, monotonically increases or decreases as a function of the second coordinate. The illumination level provided by the light source may thereby be varied depending on the position of the object, e.g. the viewer, within the detection zone.

In use of the lighting system, the coordinate system may for example be defined such that the origin coincides with the article to be illuminated wherein the first coordinate indicates a distance between the object and the article along the first direction or first coordinate axis and the second coordinate indicates a distance between the object and the article along the second direction or second coordinate axis. The second direction or second coordinate axis may correspond to a direction from which potential viewers of the article generally approaches the article. The first direction or first coordinate axis may correspond to a direction which is perpendicular to the second direction. In case of a wall supporting a painting, the second direction may be perpendicular to the horizontal extension of the wall and the first direction may extend along the wall. In case of a counter displaying articles (for example a meat counter or similar in a grocery store or a delicatessen) the first direction may extend along the length of the counter and the second direction may extend in a direction perpendicular to the first direction, and thus away from the counter. For these example usages, the above mentioned third range of values of the second coordinate may for example represent a range of distances from the wall or the counter (e.g. closer than 8 meters, between 5-2 meters etc). The above mentioned first range of values of the first coordinate may for example represent a range of distances from the second coordinate axis on a first side thereof and the above mentioned second range of values of the first coordinate may for example represent a range of distances from the second coordinate axis on a second side thereof which is opposite said first side (e.g. +/−2 meters).

The function may further be arranged to provide an illumination level parameter which, for a fourth range of values of the first coordinate and a fifth range of values of the second coordinate, is constant. This makes it possible to establish a zone of constant illumination level. Referring to the above-mentioned examples the zone may for example be defined to extend from 0 meters to 2 meters from the wall or counter and within 1 meter from the painting along the wall or from a predetermined position along the counter. It should be understood that the numerical examples above merely are provided to facilitate understanding and not should be construed as limiting.

According to one embodiment the lighting device is arranged to illuminate a region with an illumination pattern, and the controller is configured to control the illumination pattern provided by the lighting device based on the position of the object within the detection zone. The controller may be arranged to control a position of maximum illumination level within the illuminated region and a magnitude of the maximum illumination level based on the position of the object within the detection zone. The controller may in particular be arranged to control a position of maximum illumination level within the illuminated region based on the first coordinate and a magnitude of the maximum illumination level based on the second coordinate. Thereby an adaptable and variable illumination pattern may be provided to illuminate articles distributed within the illuminated region, for example in a display or a in counter. In particular the illumination of the articles may be different depending on their location within the illumination pattern and depending on the position of the object, e.g. the viewer.

According to one embodiment the lighting device is arranged to illuminate an elongate region extending along a first direction. The detector is configured to determine a first coordinate and a second coordinate representing the position of the object within the detection zone, wherein the first coordinate represents a coordinate of the object along the first direction and the second coordinate represents a coordinate of the object in a second direction perpendicular to the first direction. According to the present embodiment the controller is configured to control an illumination pattern provided by the lighting device in the elongate region based on the first and the second coordinate, wherein, for a determined position of the object, an illumination level of the illumination pattern is varied along the first direction and wherein a maximum illumination level of the illumination pattern is based on the second coordinate. Thereby an adaptable and variable illumination pattern may be provided to illuminate articles in an elongate region, for example an elongate display or counter. The second coordinate may represent a distance between the object and the elongate region, the distance being projected on the (horizontally extending) normal to the first direction. The controller may be configured to determine the position of the maximum illumination level of the illumination pattern along the first direction based on the first coordinate. Especially the position of the maximum illumination level, along the first direction, may correspond to or coincide with the first coordinate. The elongate region may include a plurality of articles distributed along the first direction, which articles are to be illuminated.

Figure 4:
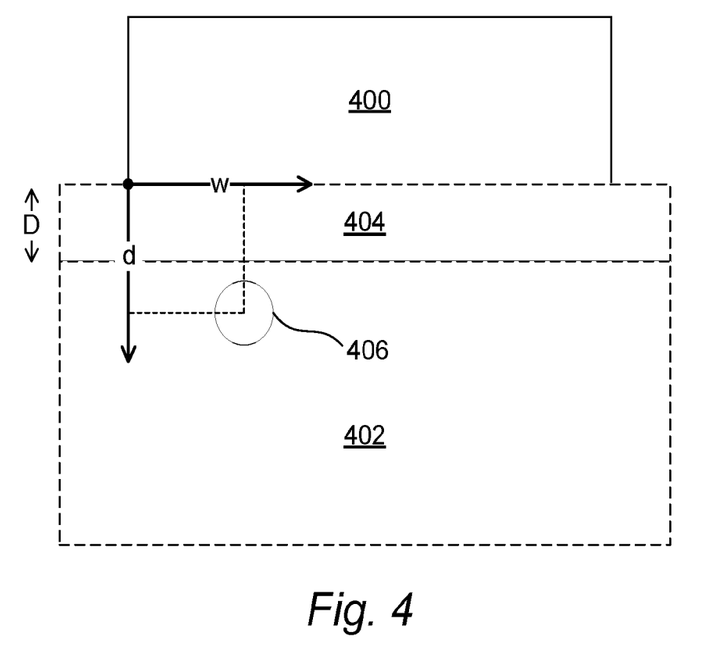
FIG. 4 schematically illustrates a lighting system according to a further embodiment.

To facilitate understanding a detailed embodiment of a lighting system will now be described with reference to FIG. 4. The lighting system (not shown in FIG. 4) includes a lighting device arranged to illuminate an elongate region at a display 400. The display 400 may in one example be a display for foodstuff, such as fresh produce or bread. In one example the display 400 may be a display for meat such as a meat counter or similar in a grocery store or a delicatessen). However the display 400 may more generally be a display for one or more light sensitive articles of any of the types mentioned earlier in the description. The display 400 and the elongate region extend in what will be referred to as a first direction. The lighting device may for example include a plurality of light emitters, such as LEDs arranged in an elongated array and being arranged to emit light which together illuminate the elongated region. The number and the density of the light emitters may be varied in accordance with the application. An increased density may provide a more precisely controllable illumination pattern. The lighting device may be arranged in the display 400, for example below a ceiling of the display 400. Each of the light emitters may present an individually controllable level of illumination or intensity, i.e. be individually dimmable. The lighting system further comprises a controller configured to control the lighting device and the light emitters thereof. The controller may be embodied in a manner analogous to the controller 104 in FIG. 1 (i.e. include an application specific integrated circuit, a programmable gate array, a programmable device such as a microprocessor etc.). The controller is configured to control the illumination level of each light emitter and thereby control an illumination pattern provided by the light source.

The system further comprises a detector defining a detection zone 402 and being configured to determine position data representing a position of an object within the detection zone 402. The detection zone 402 may be arranged to extend in front of the display 400, and advantageously cover a region which people enter for the purpose of viewing articles in the display 400. The detector may in analogy with the detector 106 be embodied as an image capturing unit capturing images of the detection zone and capable of determining a position of an object, e.g. a customer, schematically indicated by element 406 in FIG. 4, present or moving about within the detection zone 402. The detector may determine position data for the object which position data includes a pair of coordinates (wc, dc) representing the position of the object 406 within the detection zone 402 with respect to a coordinate system w-d, wherein the w-axis is parallel to the above-mentioned first direction and the d-axis is perpendicular to the w-axis. The origin of the coordinate system may for example be positioned at the article, the lighting device or some other arbitrarily chosen fixed position. In any case the coordinates (wc, dc) may represent a position of the object 406 in relation to the display 400. The detector may provide the position data (wc, dc) to the controller using a wired or wireless connection. In response to receiving the position data the controller may determine a plurality of illumination level parameters for controlling the illumination level of the light emitters of the lighting device.

Figure 5:
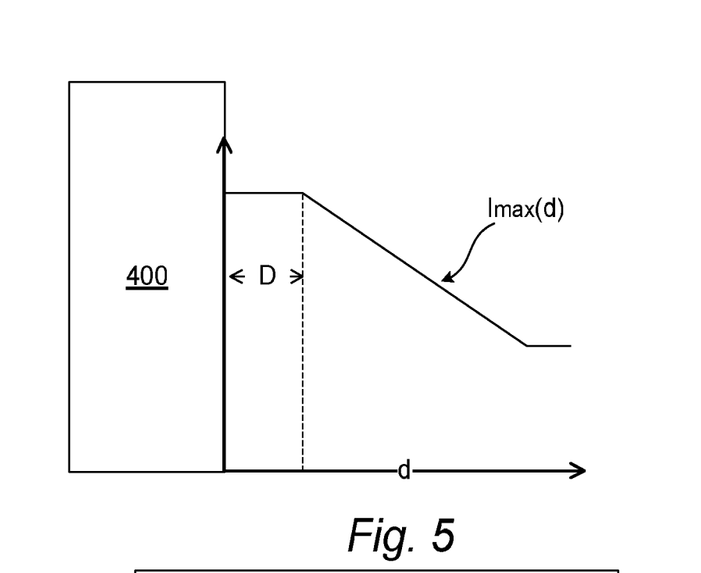
FIGS. 5 and 6 schematically illustrate illumination patterns as a function of a position of a viewer.

As illustrated in FIG. 5 the maximum illumination level $I_{max}$ of the illumination pattern for a given position (wc, dc) of the object 406 may be determined based on the coordinate dc. In particular the maximum illumination level $I_{max}$ may be gradually changed as a function of dc. In particular the maximum illumination level $I_{max}$ may be continuously decreased as a function of increasing dc. In other words, FIG. 5 illustrates the maximum illumination level $I_{max}$ of the illumination pattern as a function of the coordinate dc. The maximum illumination level $I_{max}$ may for example correspond to a maximum illumination level which the light source may provide at a given position in the elongated region. In other words the maximum illumination level $I_{max}$ may correspond to a maximum illumination level which the light source may provide at a coordinate along the w-axis.

Figure 6:
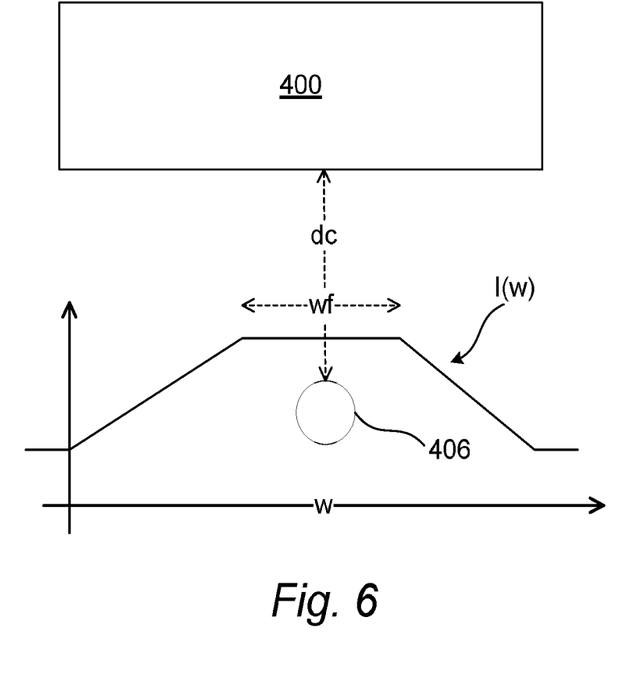

As illustrated in FIG. 6, for a given position (wc, dc) of the object 406 an illumination level provided by the illumination pattern may be varied along the first direction. The illumination level may gradually increase along the first direction to a position in the illumination pattern corresponding to the coordinate wc, and thereafter gradually decrease. At the position corresponding to the coordinate wc the illumination pattern may reach the maximum illumination level $I_{max}$ (determined e.g. in accordance with the example in FIG. 5). In other words the maximum illumination level $I_{max}$ may be provided at the coordinate wc along the w-axis. Optionally the illumination pattern may be present a region of a constant illumination level within a range wf centered at the coordinate wc.

In the examples in FIGS. 5 and 6 the illumination level may be varied between a maximum illumination level which the light source may provide at a given position (i.e. corresponding to an illumination level of 100%) and a predetermined minimum illumination level (e.g. 50% of the maximum illumination level). In addition to the piece-wise linear transitions illustrated in FIGS. 5 and 6 the transitions may be determined in accordance with any monotonically decreasing/increasing function. The functions may not even be continuously decreasing/increasing but also gradual and stepwise changes are contemplated.

Optionally the detector may further define a second detection zone 404. If the position of the object 406 falls within the second detection zone 406 the controller may be configured to control the light source to provide an illumination pattern providing a constant illumination level within the display 400 along the first direction. The controller may further control the plurality of light emitters of the light source to emit light at their respective maximum intensity. According to a further option, if more than one object 406 is present in the detection zone 402, the illumination level may be constant within the illumination pattern along the first direction. The illumination level $I_{max}$ may for example be determined based on the coordinate dc of the object which is closest to the display 200.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage. It is noted that the invention relates to all possible combinations of features recited in the claims.

The invention claimed is:

1. A lighting system for illuminating an article comprising:
    a lighting device arranged to emit light towards the article, wherein a spectrum of the emitted light is controllable, and
    a controller configured to control the lighting device responsive to detection of presence or movement of an object within a detection zone associated with the article, the controller being configured to:
        control the lighting device to emit light having a first spectrum in case of absence of an object or in case of absence of movement of an object within the detection zone, and
        control the lighting device to emit light having a second spectrum in response to presence of an object or movement of an object within the detection zone,
    wherein the light having the first spectrum presents, in at least one wavelength interval, a lower power than the light having the second spectrum,
    wherein the light having the first spectrum presents a corresponding correlated color temperature substantially equal to that of the light having the second spectrum, and
    wherein the light having the first spectrum and the light having the second spectrum provide a corresponding level of illumination of said article.

2. The lighting system according to claim 1, wherein the light having the first spectrum and the light having the second spectrum present a corresponding distance to the black body locus.

3. The lighting system according to claim 1, wherein the light having the first spectrum presents a lower color rendering index than the light having the second spectrum.

4. A lighting system for illuminating an article comprising:
- a lighting device arranged to emit light towards the article, wherein a spectrum of the emitted light is controllable, and
- a controller configured to control the lighting device responsive to detection of presence or movement of an object within a detection zone associated with the article, the controller being configured to:
  - control the lighting device to emit light having a first spectrum in case of absence of an object or in case of absence of movement of an object within the detection zone, and
  - control the lighting device to emit light having a second spectrum in response to presence of an object or movement of an object within the detection zone,
- wherein the light having the first spectrum presents, in at least one wavelength interval, a lower power than the light having the second spectrum,
- wherein the light having the first spectrum and the light having the second spectrum provide a corresponding level of illumination of said article, and
- wherein said first spectrum is a predetermined first spectrum and said second spectrum is a predetermined second spectrum, wherein said predetermined first and second spectrums are predetermined such that illumination of the article with the light having the predetermined first spectrum results in less discoloration of the article than if said article had been illuminated with the light having the second predetermined spectrum, for a same duration.

5. The lighting system according to claim 1, wherein said first spectrum is a predetermined first spectrum and said second spectrum is a predetermined second spectrum, wherein said predetermined first and second spectrums are predetermined such that the light having said predetermined first spectrum presents, in at least a wavelength interval in which said article absorbs light, a lower power than the second spectrum.

6. The lighting system according to claim 1, wherein the first spectrum presents a lower power than the second spectrum within a wavelength interval from 550 nm to 600 nm.

7. The lighting system according to claim 1, wherein the lighting device comprises a plurality of light sources, each light source being arranged to emit light of a different color than the other light sources, and the intensity of each light source being independently controllable by the controller, wherein the lighting device is arranged to emit mixed light.

8. The lighting system according to claim 7, wherein the lighting device comprises at least four light sources.

9. The lighting system according to claim 1, wherein the lighting device comprises a red, a green, a blue and an amber light source.

10. The lighting system according to claim 9, wherein an output power of the amber light source is lower for the light having the first spectrum compared to an output power of the amber light source for the light having the second spectrum.

11. The lighting system according to claim 1, further comprising a detector for defining a detection zone associated with the article and being arranged to detect presence or movement of an object within the detection zone.

12. The lighting system according to claim 11, wherein the detector is arranged to determine a distance to a detected object, and wherein the controller is arranged to control the lighting device based on the determined distance to provide a gradual transition between the light having the first spectrum and the light having the second spectrum.

13. A method of using the lighting system in accordance with claim 1, the method comprising illuminating a meat product using the lighting system.

14. A method of using the lighting system in accordance with claim 1, the method comprising illuminating at least one of a light sensitive article, a photograph, a document, a painting, an artwork, fabrics, and an artifact.

\* \* \* \* \*